UNITED STATES PATENT OFFICE.

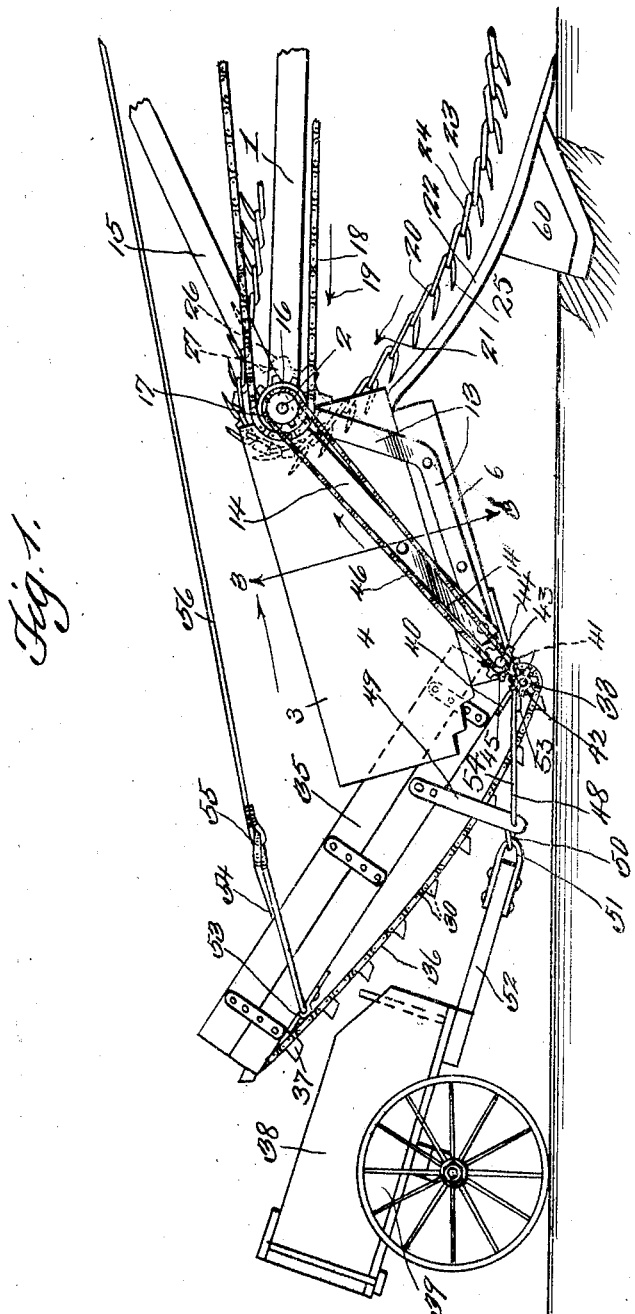

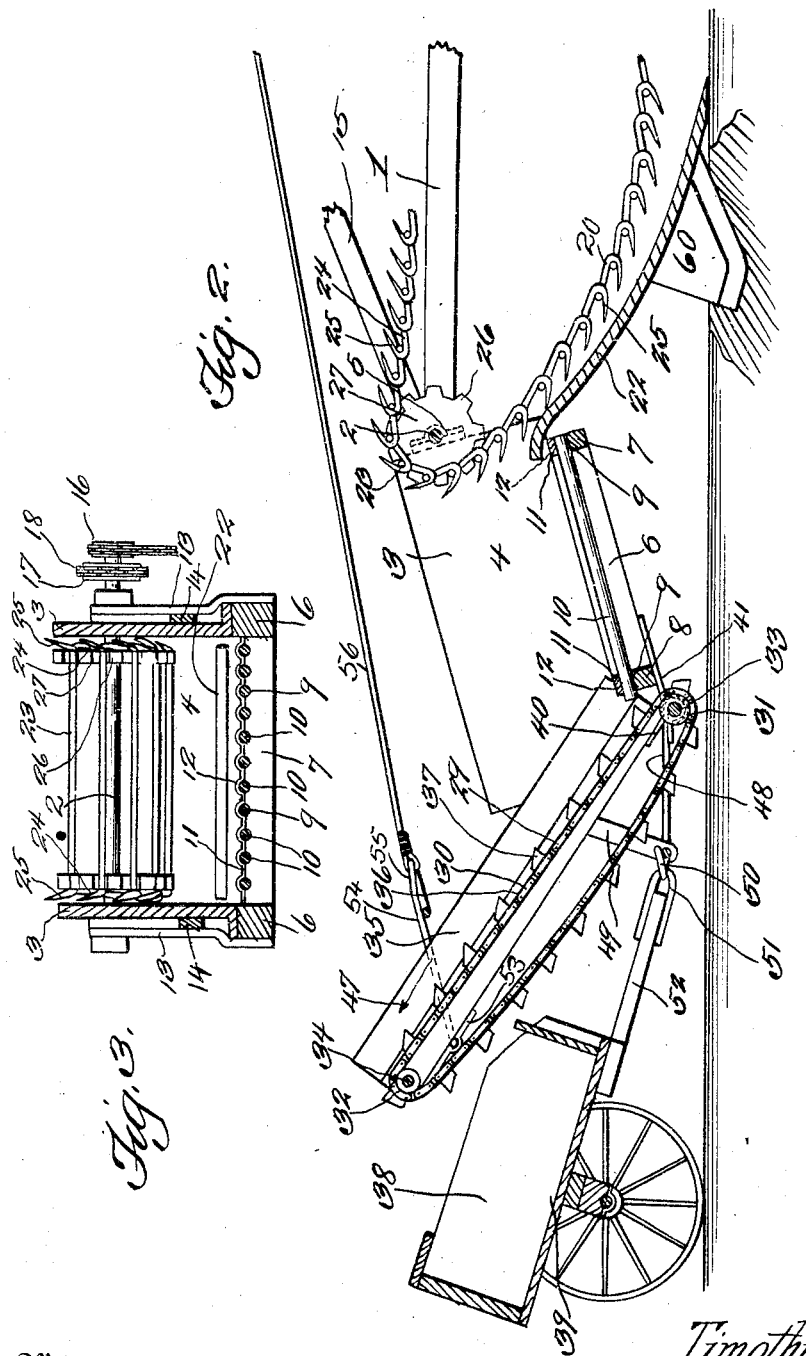

TIMOTHY EARWOOD, OF HEMINGFORD, NEBRASKA.

POTATO-DIGGER ELEVATING MEANS.

1,113,761.

Specification of Letters Patent.

Patented Oct. 13, 1914.

Application filed November 24, 1913. Serial No. 802,783.

*To all whom it may concern:*

Be it known that I, TIMOTHY EARWOOD, a citizen of the United States, residing at Hemingford, in the county of Boxbutte and State of Nebraska, have invented a new and useful Potato-Digger Elevating Means; and I do hereby declare the following to be a full, clear, and exact description of the invention, such as will enable others skilled in the art to which it appertains to make and use the same.

This invention relates to a new and useful potato digger elevating means.

One of the objects of the invention is to provide an apparatus of this nature, that as the potatoes are excavated or dug from the soil, they are fed up the digger member into a box, the bottom of which is constructed of spaced apart rods, which will permit the worthless miniature or small potatoes and dirt to fall through, while the remaining potatoes are elevated by a conveyer and deposited in a cart or other receptacle.

One of the features of this improved structure is the provision of means whereby the potato receiving box and the conveyer may be raised and lowered at the point where such parts are pivotally connected, and further means whereby the upper rear end of the conveyer may be lowered, so that the angles of the box and the conveyer relative to one another may be increased or decreased, so as to increase or decrease the rapidity of conveying the potatoes from the digger to the cart. In other words, if the potato receiving box is disposed almost horizontal, the potatoes will feed or roll from where they leave the digger to the conveyer slower. If the box is lowered thereby increasing the angle the potatoes will feed faster and vice versa.

Incidentally a potato digger knife is shown, having a flange adapted to extend sufficiently down in the soil to guide the knife so as to prevent the knife from being deflected to one side or the other by clods or sod.

In practical fields the details of construction may be subjected to alterations, falling within the scope of what is claimed.

The invention comprises further features and combination of parts, as hereinafter set forth, shown in the drawings and claimed.

In the drawings:—Figure 1 is a view in side elevation, showing substantially a diagrammatic view of a portion of a potato digger, showing the elevating means applied. Fig. 2 is a sectional view longitudinally through the apparatus. Fig. 3 is a sectional view on lines 3—3 of Fig. 1.

Referring more particularly to the drawings, 1 designates a portion or a part of a potato digger frame, in which a shaft 2 is mounted, which shaft is in turn connected to the sides 3 of the potato receiving box 4, by means of the bearing plates 5. This part 1 of the frame remains always in the position as shown. The sides 3 of the box rise from the side beams 6, which are connected by the cross beams 7 and 8, in grooves 9 of which the rods 10 are held by the plates 11, which are provided with concaved arch portions 12 to engage the rods to hold them in place. The angle bars 13 assist in holding the sides 3 to the beams 6, while the bars 14 further assist in holding the sides 3 in position. The bars 14 are constructed with extensions 15, which may be depressed or lowered and raised, so that the rear lower end of the box may be raised and lowered. In other words, the box may be rocked upon the shaft 2, and the extensions may be held in different positions by any suitable means (not shown), so as to hold the box at different angles. Mounted on the shaft 2 so as to move therewith are sprockets 16 and 17. Passing about the sprocket wheel 17 is a chain 18, which is operated in the direction of the arrow 19 in Fig. 1 by any suitable means (not shown) of the potato digger, so as to operate the conveyer chain or belt 20 in the direction of the arrow 21, which feed the potatoes up the digger knife or blade 22. This chain or belt comprises a series of rods 23 having angular ends 24, which terminate in hooks 25. The hooks 25 of each rod hook in engagement with the adjacent rod. The rods 23 engage between the teeth 26 of the sprockets 27, which are also mounted to rotate with the shaft 2. The hooks 25 of the belt or chain or conveyer operate adjacent the side edges of the digger knife or blade, to guard the potatoes against falling off the sides of the blade, while the rods 23 act to feed the potatoes up the blade, and as they are fed to the top rear portion of the blade, then fall upon the rods 10 of the box, and roll toward the elevator conveyer 29. This elevator conveyer 29 comprises the usual sprocket chain 30 passing over the sprockets 31 and 32 of the shafts 33 and 34, which are mounted in suitable bearings of the frame 35. These chains are connected by a belt 36, and also connecting the chain are pocket troughs 37, in which some of the potatoes fall as they leave the rods forming the bottom of the box. Some of the potatoes lodge between the pocket troughs, and are conveyed upwardly and rearwardly, so as to be deposited in the body 38 of the part 39, from which they are dumped at certain intervals.

The shaft 33 is mounted in bearings 40 and 41 of the frame 35 and box 4, and constitutes a pivotal connection between the frame 35 and the box. Also mounted upon the shaft 33 is a gear 42 meshing with the gear 43 of the stub shaft 44, on which a sprocket 45 is also mounted. Passing about the sprocket 45 is a chain 46, which also travels about the sprocket 16. In this manner the elevating conveyer is operated in the proper direction as indicated by the arrow 47, so as to elevate the potatoes, in order to be dumped or deposited in the body of the cart. Also connected to the shaft 33 is a bail-shaped member 48, braced relative to the frame 35 by means of the arms 49. This bail 48 is formed into an eye 50 which in turn is linked to the clevis 51 of the tongue 52 of the cart body.

Connected to the frame 35 by means of the plates 53 is a bail member 54 having an eye 55, to which a rope, cord or cable 56 is connected, as shown. This cable or rope 56 extends to a suitable location in close position to the operator of the potato digger, and is adapted to be pulled upon, in any suitable manner or by any suitable means (not shown), so as to raise and lower the rear upper end of the elevating conveyer frame.

The potatoes, during the operation of the machine, are fed upwardly upon the blade or knife as they are excavated from the soil, and when they reach the rear top portions of the blade or knife they fall upon the rods 10 forming the bottom of the box 4, then they roll down the rods, and are finally elevated and deposited in the body of the cart. If the box 4 is arranged so that the rods 10 are nearly horizontal, the rapidity of the rolling potatoes would not be so great, thereby allowing the elevator to easily pick them up and convey them rearwardly and upwardly. When the rear end of the box is raised or lowered the angle of the cart is likewise changed, so as to throw the potatoes to the rear of the cart body.

Incidentally the digger blade or knife is constructed with a flange 60 adapted to extend into the soil so as to guide the blade or shovel or digger 22, preventing the same from being deflected from one side to the other by hard pieces of sod or clods.

The invention having been set forth, what is claimed as new and useful is:—

1. In combination, a potato digger having a digger shovel, an elevator conveyer, a box pivotally connected between the elevator conveyer and the potato digger having its bottom constructed of spaced apart rods, and means for changing the inclination of the box for controlling the action of the potatoes from the shovel to the elevator conveyer, means for feeding the potatoes up the shovel to the box and having connections with the elevator conveyer for operating the same, and means for raising and lowering the rear end of the elevator conveyer, and a cart having pivotal connections with the lower end of the box and disposed beyond said elevator conveyer.

2. In combination, a potato digger having a digger shovel, a box pivotally connected to the digger having its bottom constructed of spaced apart rods extending partially under the digger shovel, a conveyer chain having hooks directed toward the shovel and acting to feed the potatoes up the shovel toward and upon the bottom of said box, the pivotal connections between the box and the digger including means whereby the inclination of the box relative to the shovel and the digger may be changed, a cart having pivotal connections with the lower end of the box, and a second conveyer arranged between the lower end of the box and the cart and extending thereover, said means for changing the angle of the box also acting to change the angle of said cart.

3. In combination, a potato digger having a digger shovel, a box pivotally connected to the digger having its bottom constructed of spaced apart rods extending partially under the digger shovel, a conveyer chain having hooks directed toward the shovel and acting to feed the potatoes up the shovel toward and upon the bottom of said box, the pivotal connections between the box and the digger including means whereby the inclination of the box relative to the shovel and the digger may be changed, a cart having pivotal connections with the lower end of the box, and a second conveyer pivoted to the lower end of the box, and disposed between the box and the cart and extending thereover, said means for changing the angle of the box also acting to change the angle of said cart, and means for changing the inclination of the second conveyer.

In testimony whereof I have signed my name to this specification in the presence of two subscribing witnesses.

TIMOTHY $\underset{\text{mark.}}{\overset{\text{his}}{\times}}$ EARWOOD.

Witnesses:
   C. H. McFARLAND,
   C. J. HULAC.
Witness to mark:
   L. P. PASEWALK.